US006168738B1

(12) United States Patent
Douchet et al.

(10) Patent No.: US 6,168,738 B1
(45) Date of Patent: Jan. 2, 2001

(54) METHOD OF FIREPROOFING A PLASTICS MATERIAL COMPONENT IN AN FLAMMABLE LIQUID SUPPLY APPARATUS

(75) Inventors: Jean-Claude Douchet, Plessis-Brion; André Deltour, Noyon, both of (FR)

(73) Assignee: Nobel Plastiques, Nanterre (FR)

( * ) Notice: Under 35 U.S.C. 154(b), the term of this patent shall be extended for 0 days.

(21) Appl. No.: 08/860,726

(22) PCT Filed: Jan. 30, 1996

(86) PCT No.: PCT/FR96/00154

§ 371 Date: Jul. 16, 1997

§ 102(e) Date: Jul. 16, 1997

(87) PCT Pub. No.: WO96/23656

PCT Pub. Date: Aug. 8, 1996

(30) Foreign Application Priority Data

Feb. 2, 1995 (FR) .................................................. 95/01219
Nov. 13, 1995 (FR) .................................................. 95/13395

(51) Int. Cl.$^7$ .................................................. B29C 47/06
(52) U.S. Cl. .................. 264/171.26; 264/331.15; 264/236; 264/238; 427/372.2; 427/384; 427/412.1; 427/393.5
(58) Field of Search .................. 264/171.26, 173.13, 264/330, 331.11, 331.15, 236, 238; 427/372.2, 377, 384, 387, 412.1, 393.5

(56) References Cited

U.S. PATENT DOCUMENTS 4,929,409 * 5/1990 Agren et al. ..................... 264/171.26
5,191,019    3/1993 Dahl et al. .
5,266,637 * 11/1993 Gondard et al. ..................... 525/104

FOREIGN PATENT DOCUMENTS 286602   1/1991 (DE) .
0256967  2/1988 (EP) .
1510994  5/1978 (GB) .
9313161  7/1993 (WO) .

OTHER PUBLICATIONS

Patent Abstracts of Japan vol. 95 No. 001 & JP A 07016908 (Shin Etsu Chem Co Ltd)Jan. 20, 1995.
Patent Abstracts of Japan vol. 4 No. 166 (C–031) 18 11 80 & JP A 55108437 (Hitachi Cable Ltd) 20.8.8.
Database WPI Week 8734 Derwent Publications Ltd.London GB AN 87238828 XP002004004 &JPA62161850 (Dainichi Nippon Cables) &é Jul. 1987.
Database WPI Week 8248 Derwent Publications ltd London GB AN 8203537J XP002004005 & JP A57172909 (Hitachi Cable KK) Oct. 25, 1982.
Database WPI Week 8624 Derwent Publications Ltd London GB AN 86153450 XP002004006 & JP A 61087746 (Tatsuta Densen KK) May 6, 1986.
Database WPI Week 7525 Derwent Publications Ltd London GB AN 7541667w XP002004007 & JP A 49113845 (Hitachi Cable KK) Oct. 30, 1974.
Database WPI Week 9407 Derwent publications Ltd. London GB AN 94054026 XP002004008 & JP A 06009843 (Sumitomo Chem Co Ltd) Jan. 18, 1994.

* cited by examiner

Primary Examiner—Jan H. Silbaugh
Assistant Examiner—Kenneth M. Jones
(74) Attorney, Agent, or Firm—Nixon Peabody LLP; Stuart J. Friedman

(57) ABSTRACT

A method of fireproofing a component of thermoplastic material belonging to an installation for distributing a flammable liquid such as a fuel, the method consisting in coating the outside of the component in a compound based on polyvinyl chloride (PVC) that is grafted so as to be cross-linked.

8 Claims, No Drawings

METHOD OF FIREPROOFING A PLASTICS MATERIAL COMPONENT IN AN FLAMMABLE LIQUID SUPPLY APPARATUS

The present trend in motor vehicles is to replace metal pipework by pipework made of plastics material, and in particular based on polyamide (nylon).

BACKGROUND OF THE INVENTION

A constant concern of motor manufacturers is to improve the fire resistance of installations which convey flammable fluid. To this end, they define standards or at least requirements that must be satisfied by the components used in such installations, and which tend to increase the time they can withstand fire. Thus, at present, requirements are such that any installation conveying a flammable liquid must be capable of withstanding flame for at least 2 minutes.

On average, present-day pipework is based on single or multilayer polyamide withstands flame for about 30 seconds when subjected to the test procedure laid down by certain motor manufacturers such as Renault or Mercedes.

Attempts have thus been made to protect the outside of such pipework, and techniques exist which implement sheaths of aluminum or sheaths of glass fiber cloth that are offset by several millimeters from the pipework so as to prevent the heat of the flame propagating to the thermoplastic pipework and puncturing it as the material thereof melts. Nevertheless, such solutions are expensive because of the material used.

OBJECT AND SUMMARY OF THE INVENTION

The present invention seeks to remedy that main drawback of the state of the art by proposing a method of fireproofing a component for an installation that is designed to convey a flammable fluid such as gasoline.

More precisely, the invention thus provides a method of fireproofing a component made of thermoplastic material and belonging to an installation for distributing a flammable liquid such as a fuel, the method consisting in coating the outside of the component in a compound based on polyvinyl chloride (PVC) grafted, in particular with organosilanes, so as to be capable of being cross-linked in the last stage of product manufacture by raising its temperature, optionally in the presence of moisture, depending on which catalyst for triggering cross-linking has been added to the compound. It has been observed, surprisingly, that the flame resistance of pipework coated in such a layer (or enclosed in a sheath) of PVC that has been cross-linked in this way is very considerably improved, and that this is done at a cost that is much lower than that of known techniques. This flame resistance has been increased by incorporating a finely-divided inorganic filler in the cross-linkable PVC, so that the filler content is equal to 80% to 100% by weight of the resin. It is common practice in this field to express the quantity of filler in terms of percent of resin: in this case, that means that the weight of the inorganic filler is practically equal to the weight of resin used. The inorganic filler may be antimony oxide.

MORE DETAILED DESCRIPTION

At present, such cross-linkable PVCs are made available on the market by HYDROPOLYMERE under the reference R1762-1-2. We are also aware of some sold by NORSK HYDRO PLAST under the name NORVINEX (2801-2802-2900-3500-3600-4200).

It will be observed that after a sheath has been fabricated on its own or by coextrusion, overmolding, or coinjection of a protective layer, cross-linking takes place during a stage in which the product is treated in a hot atmosphere that is optionally moist, causing the PVC sheath or outer layer to become cross-linked. This cross-linking seeks to establish bonds between molecular chains in order to reinforce the temperature rating thereof. To control the moment at which cross-linking takes place, which must occur during the final stage of the method of producing the product, a catalyst is included in the grafted PVC compound to enable cross-linking to be triggered under the effect of temperature (with or without the presence of moisture), the product itself being finished.

Successful use has also been made of a PVC including a ceramic additive with a content equal to 25% to 50% by weight of resin, plus an expandable material. It is observed that when this type of coating is subjected to flame, it increases in volume because of the expandable additive it contains, and as it expands it entrains ceramic particles which, when subjected to the flame and when the expandable material pyrolizes under the effect of the flame, constitute a kind of heat shield which protects the component inside for a length of time that is sufficient to satisfy the standards issued by motor manufacturers.

Finally, a PVC-based compound has been used provided with a swelling filler of the kind used in the paint field. By way of example, the filler may be of the type manufactured by Laboratoires LURIE.

Surprisingly, the resistance to flame of similar thicknesses of each of the above coatings is equivalent. Thus, a coating having a thickness of 1 millimeter has been given the ability to withstand flame for about 2 minutes, a thickness of 1.5 mm withstanding flame for about 6 minutes, and a thickness of 2 mm withstanding flame for about 6½ minutes, in all cases using the motor manufacturers' test procedure.

In a first application, the coating of the invention is a sheath that is separate from the component and inside which the component to be protected is housed. This application is particularly advantageous when the component is a bellows or a corrugated tube.

However one of the advantages of the method of the invention lies in the fact that it makes it possible to apply the coating directly onto the outside surface of a thermoplastic material component, i.e. it is possible to apply the PVC-based compound directly thereon, thus making it possible to integrate the step of fireproofing the component in the step of manufacturing that component itself.

Thus, if the component is a tube, the method consists in coextruding the PVC compound together with the tube. In contrast, if the component is not tubular, e.g. being constituted by a coupling or a T-connection, . . . , then the method consists in covering the component either by overmolding if the component is treated after manufacture, or by injection if it is treated during manufacture, by using a two-compound injection procedure, the first compound being the thermoplastic material and the second being one of the PVC compounds mentioned above.

Finally, it is of interest to observe that it is not very important for the coextruded, overmolded, or coinjected materials to be compatible, given that the coating material does not contribute in any way to the mechanical strength of the tubing of the coupling or the component, nor to the barrier functions that said tubing or component needs to provide against the fluid being conveyed. Only a screen function is involved.

What is claimed is:

1. A method of fireproofing a component of thermoplastic material belonging to an installation for distributing a flammable liquid comprising coating the outside of the component with a layer of a compound based on a cross linkable polyvinyl chloride resin, wherein said polyvinyl chloride compound includes a ceramic filler at a concentration of 25% to 50% by weight of resin, together with a heat expandable material.

2. A method according to claim 1, wherein said polyvinyl chloride compound includes a finely divided inorganic filler, at a concentration equal to 80% to 100% by weight of said resin.

3. A method according to claim 2, wherein said polyvinyl chloride compound includes a swelling filler.

4. A method according to claim 3 for fireproofing a tube of thermoplastic material belonging to an installation for distributing a flammable liquid, comprising coextruding, together with and onto the outer surface of the thermoplastic material of the tube, said compound and cross linking said compound after coextrusion.

5. A method according to claim 3 for fireproofing a bellows or a corrugated tube of thermoplastic material belonging to an installation for distributing a flammable liquid, comprising making a sheath of said compound, cross linking said compound and housing said bellows or corrugated tube within said sheath.

6. A method according to claim 1, wherein said polyvinyl chloride compound includes a swelling filler.

7. A method of fireproofing a component of thermoplastic material belonging to an installation for distributing a flammable liquid comprising coating the outside of the component with a layer of a compound based on a cross linkable polyvinyl chloride resin, wherein said polyvinyl chloride compound includes a swelling filler.

8. A method according to claim 7, wherein said polyvinyl chloride compound includes a finely divided inorganic filler, at a concentration equal to 80% to 100% by weight of said resin.

* * * * *